United States Patent [19]

Battson et al.

[11] Patent Number: 4,807,443
[45] Date of Patent: Feb. 28, 1989

[54] REFRIGERATION CONTROL SYSTEM

[76] Inventors: R. Kenneth Battson, 11331 Sheldon St., Sun Valley, Calif. 91352; John E. Masopust, Jr., 14333 Van Nuys Blvd., Unit 59, Arleta, Calif. 91331

[21] Appl. No.: 111,404

[22] Filed: Oct. 20, 1987

[51] Int. Cl.⁴ ............................................. F25D 13/04
[52] U.S. Cl. ............................................ 62/65; 62/231
[58] Field of Search .................... 62/231, 62, 65, 430, 62/130

[56] References Cited

U.S. PATENT DOCUMENTS

| | | | |
|---|---|---|---|
| 2,428,312 | 9/1947 | Herbener | 62/231 X |
| 4,292,811 | 10/1981 | Kamejima et al. | 165/18 X |
| 4,314,454 | 2/1982 | Kamejima et al. | 165/18 X |
| 4,637,219 | 1/1987 | Grose | 62/430 X |
| 4,697,429 | 10/1987 | Chandler et al. | 62/231 X |

Primary Examiner—William E. Wayner
Attorney, Agent, or Firm—Pretty, Schroeder, Brueggemann & Clark

[57] ABSTRACT

A refrigeration system that maintains the temperature of products continuously within prescribed limits, while using electrical power only during selected time periods of each day, when the cost of that power is relatively low. During that time period, the refrigeration system cools the product to a temperature significantly lower than its normal storage temperature, such that subsequently, during a time period when electrical power is relatively expensive, the compressor and fan of the refrigeration system are disabled and the inherent thermal storage capacity of the product, itself, ensures that the product temperature will not rise above a predetermined maximum temperature.

16 Claims, 1 Drawing Sheet

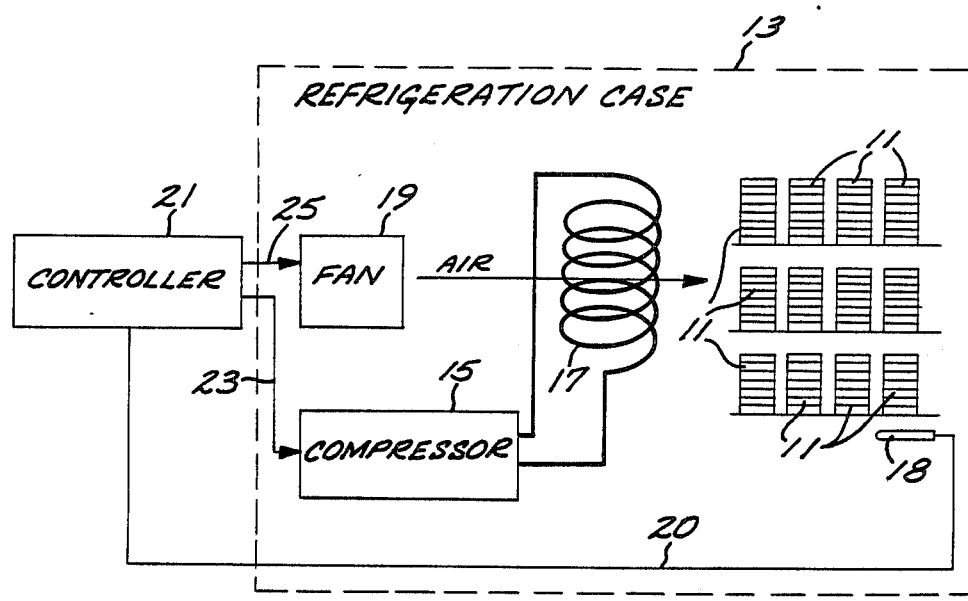
FIG.1
FIG.2
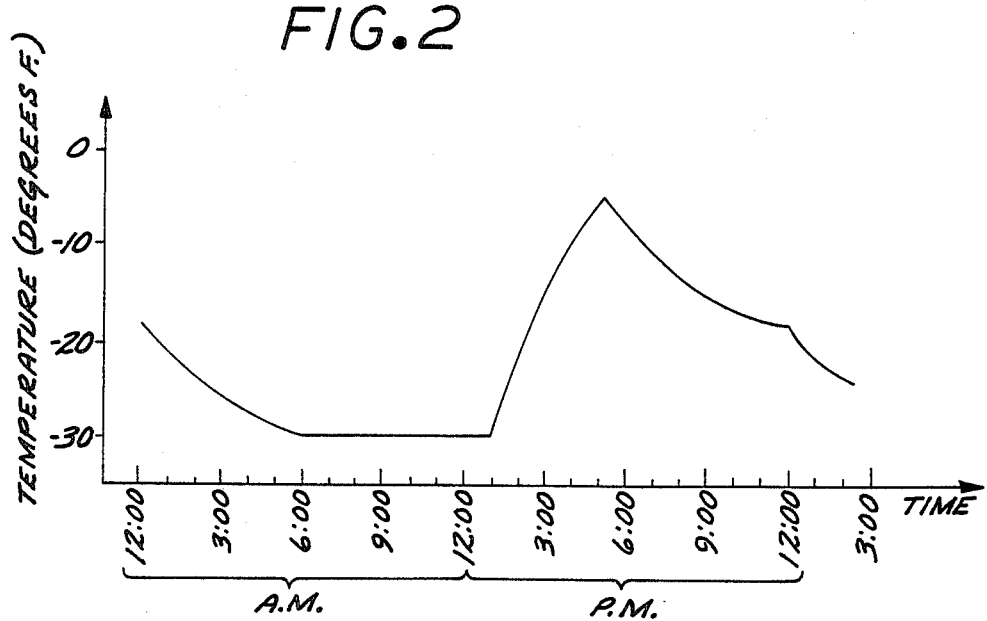

REFRIGERATION CONTROL SYSTEM

BACKGROUND OF THE INVENTION

This invention relates generally to systems for refrigerating food products and the like, and, more particularly, to refrigeration systems that maintain the product temperature within certain limits while using electrical power during only prescribed time periods of each day.

Electrical utilities are finding it increasingly difficult and expensive to meet the public's increased demands for electrical power. Changing lifestyles are causing this increased power demand to greatly outstrip increases in population. The difficulty in meeting the increasing demand for electrical power arises in part because of a concern for the effect additional and/or expanded power plants might have on air and water quality and on public safety.

The demand for electrical power varies widely with the time of day. Typically, summer afternoons and winter evenings are periods of particularly high usage. Conversely, night time periods between 12:00 midnight and 6:00 A.M. are periods of particularly low usage. During such periods of such low electrical power usage, much of the capacity of existing power plants is unused.

It is recognized that one viable alternative to the building of costly new power plants, or the expansion of existing plants, is to shift many uses of electrical power from periods of high usage to periods of low usage. For example, some commercial users of large amounts of electrical power scale back their operations at certain times of each day and shift those operations to time periods.

Electrical utilities have been implementing special rate schedules designed to encourage this time shifting of electrical power usage. Commercial users of electrical power must pay substantially more for each unit of power during periods of high power usage than during periods of low power usage. In fact, the cost ratio for these two periods can be as high as about ten.

One substantial use of electrical power is in the refrigeration of food, particularly by grocery stores. Enormous amounts of electrical power are consumed in maintaining certain food products either frozen or colder than room temperature, 24 hours of each day. Because of this requirement to continuously maintain the temperature of food products at prescribed cold temperatures, it has not generally been thought to be feasible for businesses of this kind to use the time-shifting technique described above to reduce their cost of electrical power.

It should, therefore, be appreciated that there is a need for a refrigeration system for refrigerating products such as food that maintains the temperature of the product within certain limits while using electrical power substantially only during certain predetermined periods of each day; when electrical power is relatively inexpensive. The present invention fulfills this need.

SUMMARY OF THE INVENTION

The present invention is embodied in a refrigeration apparatus for refrigerating products such as frozen food, which maintains the product temperature continuously within certain limits, while using electrical power only during certain predetermined time periods of each day, i.e., when the cost of electrical power is relatively low. The refrigeration apparatus uses electrical power having a relatively low cost during a first predetermined time period of each day and a relatively high cost during a second predetermined time period of each day. The refrigeration apparatus includes a refrigeration device and control means for enabling the refrigeration device to cool the product to a predetermined low temperature during the first predetermined time period of each day. In accordance with the invention, the control means also operates to disable the refrigeration device during the second predetermined time period of each day, to permit the temperature of the cooled product to rise from the predetermined low temperature. This predetermined low temperature is selected such that the product temperature will not rise above a predetermined maximum value during the second predetermined time period of each day. The apparatus thereby effectively maintains the product in a suitable condition while utilizing minimal electrical power, if any, during those time periods of the day in which the power is most expensive.

The electrical power used by the refrigeration apparatus sometimes has an intermediate cost during a third predetermined time period of each day, following the second predetermined time period. In such cases, the control means further includes means for operating the refrigeration means to cool the product to a predetermined intermediate temperature, between the predetermined low and maximum temperatures, during that third time period.

Sometimes, due to unusual circumstances, the product temperature can rise faster than expected, during the second predetermined time period, when the refrigeration device is normally disabled. To accommodate such cases, the control means can further include means for periodically operating the refrigeration device during that second time period.

In another aspect of the invention, the refrigeration apparatus further includes means for testing a sample of product to determine the rate of its rise in temperature when the refrigeration device is disabled. Means, responsive to this determined rate of temperature rise, then determines the predetermined low temperature required to prevent the product temperature from rising above the predetermined maximum value when the refrigeration device is disabled.

In yet another aspect of the invention, the refrigeration device is disabled in stages. In particular, a refrigeration compressor is disabled initially and a refrigeration fan is disabled subsequently.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 1 is a simplified schematic diagram of a refrigeration apparatus embodying the present invention.

FIG. 2 is a graph depicting the change in product temperature effected by the refrigeration apparatus of FIG. 1, over one 24-hour period.

DESCRIPTION OF THE PREFERRED EMBODIMENT

With reference now to FIG. 1, there is shown a refrigeration apparatus for refrigerating frozen food product 11 and maintaining the product's temperature continuously below a predetermined maximum value, e.g., minus 5 degrees F. The apparatus includes a refrigeration case 13 having an insulated compartment for carrying the frozen food product. Doors (not shown) normally enclose the compartment, to help insulate the product. A refrigeration compressor 15 is housed in a separate compartment of the refrigeration case, for compressing a suitable refrigerant (e.g., Freon) and for pumping the compressed refrigerant through a series of coils 17. A fan 19 blows air across the coils and onto the stored product to transfer heat away from the product and lower its temperature, accordingly.

A refrigeration controller 21 outputs appropriate control signals on lines 23 and 25, for switching on and off the compressor 15 and fan 19, respectively, so as to regulate the temperature of the stored product 11 in a prescribed fashion. A thermometer 18 located within the food compartment, supplies a temperature signal on line 20 to the controller, for use in monitoring product temperature.

In the past, refrigeration controllers of this kind have regulated the product temperature to be continuously within a narrow prescribed temperature range. If the product temperature ever exceeded a predetermined threshold, the controller would switch the compressor on; conversely, if the product temperature ever dropped below a separate, lower threshold, the controller would switch the compressor back off. The fan normally remained on continuously.

The control scheme described briefly above in connection with prior refrigeration apparatus of this kind is effective if the cost of the electrical power used by the compressor 15 and fan 19 is uniform throughout each 24-hour period. However, such a uniform rate structure is no longer prevalent. On the contrary, electrical utilities are now instituting rate structures in which a substantially higher rate is charged for power delivered during predetermined periods of high usage, such as summer afternoons and winter evenings.

In accordance with the invention, the refrigeration apparatus takes advantage of the variable rate structure described above by adapting the controller 21 to disable the compressor 15 and fan 19 during those predetermined time periods of each day when the cost of electrical power is relatively high. Conversely, during those predetermined time periods of each day when electrical power is relatively inexpensive, the controller operates the compressor and fan to cool the food product 11 to a significantly lower temperature than is normally done by prior refrigeration apparatus. The apparatus relies on the inherent thermal storage capacity of the cooled product during those time periods when the compressor and fan are disabled, to help maintain the product temperature below the predetermined maximum value (i.e., minus 5 degrees F.).

With reference now to FIG. 2, there is shown a graph of the temperature of the cooled food product 11 being stored in the refrigeration case 13 of FIG. 1, over a 24-hour period. The depicted graph is an exemplary temperature profile that might be followed for a typical rate structure in which a maximum rate is charged for electrical power used in the period of 1:00 P.M. to 5:00 P.M., a minimum is charged for the period of 12:00 midnight to 6:00 A.M., and an intermediate rate is charged for the periods of 6:00 A.M. to 1:00 P.M. and 5:00 P.M. to 12:00 midnight.

It will be noted in FIG. 2 that between 12:00 midnight and 6:00 A.M., when the cost of electrical power is at a minimum, the refrigeration apparatus of FIG. 1 cools the frozen food product 11 to a selected low temperature of about minus 30 degrees F. Thereafter, from 6:00 A.M. to 1:00 P.M., when the cost of power is at an intermediate value, the product temperature is maintained at its minus 30 degree F. value. At 1:00 P.M., the beginning of the high-rate period, the controller 21, via control lines 23 and 25, switches off the compressor 15 and fan 19, permitting the product temperature to begin rising. This temperature rise continues until 5:00 P.M., when the intermediate rate is again being applied. From 5:00 P.M. to 12:00 midnight, the controller operates the compressor and fan to cool the product to a temperature of about minus 18 degrees F. This is a typical temperature at which grocery stores maintain their frozen food products. When 12:00 midnight is again reached, the apparatus again operates to cool the product to minus 30 degrees F., as described above.

The minus 30 degree F. temperature is selected based on prior testing of samples of the product 11 being refrigerated. In that testing, the rate of product temperature rise when the compressor 15 and fan 19 are switched off is determined. This rate of temperature rise determination incorporates the effects of the insulating characteristics of the refrigeration case 13, as well as certain characteristics of the product, itself. In general, products having a larger volume and higher weight density will have larger thermal storage capacities and thus experience a lower rate of temperature rise.

Based on this testing, it is determined what particular low temperature is required for the product temperature not to rise above the predetermined maximum temperature value (i.e., minus 5 degrees F.) during the 1:00 P.M. to 5:00 P.M. time period, when the controller 21 has switched off the compressor 15 and fan 19. Thus, for example, relatively large and dense products such as blocks of ice, need not be cooled to as low a temperature during the 12:00 midnight to 6:00 A.M. time period as need be other, smaller and less dense products.

In some circumstances, e.g., when the door to the refrigeration case 13 remains open for an excessive time period, the temperature of the product 11 can rise at a faster rate during the 1:00 P.M. to 5:00 P.M. time period than the previous testing would indicate. In such cases, the product temperature could rise above the prescribed maximum value of minus 5 degrees F. When this occurs, as sensed by the thermometer 18 located within the case, the controller 21, via the control lines 23 and 25, again switches on the compressor 15 and fan 19, to cool the product. The controller thereafter cycles the compressor and fan on and off, in a conventional fashion to maintain the product temperature at, or just below, the minus 5 degree F. value until 5:00 P.M. If a particular grocery store includes multiple refrigeration cases like the case described above, the controllers for these cases are preferably interconnected such that only one compressor and fan set are turned on at any one time during the 1:00 P.M. to 5:00 P.M. period.

At about 1:00 P.M., when the controller 21 switches off the compressor 15 and fan 19, it does so in a staggered fashion. In particular, shortly before 1:00 P.M., the controller first outputs an appropriate signal on line 23 to switch off the compressor 15. For a short time period, the fan continues to blow air across the coils 17 and onto the food product 11. About 15 minutes later, the controller outputs an appropriate signal on line 25 to switch off the fan. If the fan remained switched on beyond this time, it would function to warm the product. The rate of product temperature rise is reduced by minimizing the flow of air across it.

The refrigeration apparatus described above is specifically adapted for refrigerating frozen food products 11 and its controller 21 is programmed to operate in accordance with one particular electrical power rate schedule. It will be appreciated that similar refrigeration schemes can be used for other products, such as non-frozen dairy products, and for other electrical power rate schedules.

It should be appreciated from the foregoing description that the present invention provides an improved refrigeration apparatus that effectively maintains the temperature of a product within certain limits while using electrical power only during certain predetermined time periods of each day. The apparatus cools the product to a temperature significantly lower than its normal storage temperature during time periods when electrical power is relatively inexpensive and then relies on the inherent thermal storage capacity of the cooled product, itself, to prevent the product temperature from rising above a selected maximum value during a subsequent time period, when electrical power is relatively expensive.

Although the present invention has been described in detail with reference to the presently preferred embodiment, those of ordinary skill in the art will appreciate that various modifications can be made without departing from the invention. Accordingly, the invention is defined only by the following claims.

We claim:

1. Refrigeration apparatus for continuously maintaining the temperature of a product below a predetermined maximum temperature, the refrigeration apparatus using electrical power having a relatively low cost during a first predetermined time period of each day, a relatively high cost during a second predetermined time period of each day, and an intermediate cost during a third predetermined time period of each day, following the second predetermined time period, the refrigeration apparatus comprising:
   refrigeration means for cooling the product; and
   control means for enabling the refrigeration means to cool the product to a predetermined low temperature during the first predetermined time period of each day, for disabling the refrigeration means from cooling the product during the second predetermined time period of each day, thereby permitting the temperature of the cooled product to rise from the predetermined low temperature, and for enabling the refrigeration means to cool the product to a predetermined intermediate temperature, between the predetermined low and maximum temperatures, during the third predetermined time period;
   wherein the predetermined low temperature is selected such that the temperature of the product will not rise above a predetermined maximum temperature during the second predetermined time period of each day.

2. Refrigeration apparatus as defined in claim 1, and further including:
   means for testing a sample of the product to determine the rate of its rise in temperature from the predetermined low temperature when the refrigeration means is disabled; and
   means, responsive to the determined rate of product temperature rise, for determining the predetermined low temperature required to prevent the temperature of the product from rising above the predetermined maximum temperature during the second predetermined time period of each day.

3. Refrigeration apparatus as defined in claim 1, wherein:
   the refrigeration means includes a case for carrying product, a refrigeration compressor and associated coils, and a fan for blowing air across the coils and the product carried in the case; and
   the control means includes means, operable during the second predetermined time period, for initially disabling the compressor and subsequently disabling the fan.

4. Refrigeration apparatus as defined in claim 1, wherein the control means further includes means for periodically enabling the refrigeration means during the second predetermined time period, to cool the product.

5. A method for refrigerating product using a refrigeration device that uses electrical power having a relatively low cost during a first predetermined time period of each day, a relatively high cost during a second predetermined time period of each day, and an intermediate cost during a third predetermined time period of each day, following the second predetermined time period, the method comprising steps of
   enabling the refrigeration device to cool the product to a predetermined low temperature during the first predetermined time period of each day;
   disabling the refrigeration device from cooling the product during the second predetermined time period of each day, thereby permitting the temperature of the cooled product to rise from the predetermined low temperature;
   enabling the refrigeration device to cool the product to a predetermined intermediate temperature, between the predetermined low and maximum temperatures, during the third predetermined time period; and
   repeating the steps of enabling, disabling and enabling the refrigeration device when the respective first, second and third predetermined time periods are reached each day;
   wherein the predetermined low temperature is selected such that the temperature of the product will not rise above a predetermined maximum temperature during the second predetermined period of each day.

6. A method as defined in claim 5, and further including preliminary steps of testing a sample of the product to determine the rate of its rise in temperature from the predetermined low temperature when the refrigeration device is disabled, and, based on the determined rate of product temperature rise, determining the predetermined low temperature required to prevent the temperature of the product from rising above the predetermined maximum temperature during the step of disabling.

7. A method as defined in claim 5, wherein:
   the refrigeration device includes a case for carrying product, a refrigeration compressor and associated coils, and a fan for blowing air across the coils and the product carried in the case; and
   the step of disabling includes steps of initially disabling the compressor and subsequently disabling the fan.

8. A method as defined in claim 5, and further including a step of periodically interrupting the step of disabling, during the second predetermined time period, and enabling the refrigeration device to cool the product.

9. Control apparatus for a refrigeration system of the kind that uses electrical power having a relatively low cost during a first predetermined time period of each day, a relatively high cost during a second predetermined time period of each day, and an intermediate cost during a third predetermined time period of each day, following the second predetermined time period, the control apparatus comprising:

means for enabling the refrigeration system to cool a product to a predetermined low temperature during the first predetermined time period of each day;

means for disabling the refrigeration system from cooling the product during the second predetermined time period of each day, thereby permitting the temperature of the cooled product to rise from the predetermined low temperature; and means for enabling the refrigeration means to cool the product to a predetermined intermediate temperature, between the predetermined low and maximum temperatures, during the third predetermined time period;

wherein the predetermined low temperature is selected such that the temperature of the product will not rise above a predetermined maximum temperature during the second predetermined time period of each day.

10. Control apparatus as defined in claim 9, and further including:

means for testing a sample of the product to determine the rate of its rise in temperature from the predetermined low temperature when the means for disabling the refrigeration system is operating; and means, responsive to the determined rate of product temperature rise, for determining the predetermined low temperature required to prevent the temperature of the product from rising above the predetermined maximum temperature during the second predetermined time period of each day.

11. Control apparatus as defined in claim 9, wherein:
the refrigeration system includes a case for carrying product, a refrigeration compressor and associated coils, and a fan for blowing air across the coils and the product carried in the case; and the means for disabling includes means, operable during the second predetermined time period, for initially disabling the compressor and subsequently disabling the fan.

12. Control apparatus as defined in claim 9, and further including means for periodically enabling the refrigeration means during the second predetermined time period, to cool the product.

13. Refrigeration apparatus for continuously maintaining the temperature of a product below a predetermined maximum temperature, the refrigeration apparatus using electrical power having a relatively low cost during a first predetermined time period of each day, a relatively high cost during a second predetermined time period of each day, and an intermediate cost during a third predetermined time period of each day, the refrigeration apparatus comprising:

refrigeration means including a case for carrying product to be cooled, a refrigeration compressor and associate coils, and a fan for blowing air across the coils and the product carried in the case;

control means for controllably operating the refrigeration means, to cool the product in a prescribed fashion, the control means including means for enabling the refrigeration means to cool the product to a predetermined low temperature during the first predetermined time period of each day, means for disabling the refrigeration means form cooling the product during the second predetermined time period of each day, thereby permitting the temperature of the cooled product to rise from the predetermined low temperature, the means for disabling including means for initially disabling the compressor and means for subsequently disabling the fan, and means for enabling the refrigeration means to cool the product to a predetermined intermediate temperature, between the predetermined high and low temperature, during the third predetermined time period;

means for testing a sample of the product to determine the rate of its rise in temperature from the predetermined low temperature when the refrigeration means is disabled; and means, responsive to the determined rate of product temperature rise, for determining the predetermined low temperature required to prevent the temperature of the product from rising above the predetermined maximum temperature during the second predetermined time period of each day.

14. Refrigeration apparatus for continuously maintaining the temperature of a product below a predetermined maximum temperature, the refrigeration apparatus using electrical power having a relatively low cost during a first predetermined time period of each day and a relatively high cost during a second predetermined time period of each day, the refrigeration apparatus comprising:

refrigeration means for cooling the product;
control means for enabling the refrigeration means to cool the product to a predetermined low temperature during the first predetermined time period of each day and for disabling the refrigeration means from cooling the product during the second predetermined time period of each day, thereby permitting the temperature of the cooled product to rise from the predetermined low temperature;

means for testing a sample of the product to determine the rate of its rise in temperature from the predetermined low temperature when the refrigeration means is disabled; and means, responsive to the determined rate of product temperature rise, for selecting the predetermined low temperature so as to prevent the temperature of the product from rising above the predetermined maximum temperature during the second predetermined time period of each day.

15. A method for refrigerating product using a refrigeration device that uses electrical power having a relatively low cost during a first predetermined time period of each day and a relatively high cost during a second predetermined time period of each day, the method comprising steps of:

enabling the refrigeration device to cool the product to a predetermined low temperature during the first predetermined time period of each day;

disabling the refrigeration device from cooling the product during the second predetermined time period of each day, thereby permitting the temperature of the cooled product to rise from the predetermined low temperature;

repeating the steps of enabling and disabling the refrigeration device when the respective first and second predetermined time periods are reached each day; and preliminary testing a sample of the product to determine the rate of its rise in temperature from the predetermined low temperature when the refrigeration device is disabled, and, based on the determined rate of product temperature rise, selecting the predetermined low temperature so as to prevent the temperature of the product from rising above a predetermined maximum temperature during the step of disabling.

16. Control apparatus for a refrigeration system of the kind that uses electrical power having a relatively low cost during a first predetermined time period of each day and a relatively high cost during a second predetermined time period of each day, the control apparatus comprising:

means for enabling the refrigeration system to cool a product to a predetermined low temperature during the first predetermined time period of each day;

means for disabling the refrigeration system from cooling the product during the second predetermined time period of each day, thereby permitting the temperature of the cooled product to rise from the predetermined low temperature;

means for testing a sample of the product to determine the rate of its rise in temperature from the predetermined low temperature when the means for disabling the refrigeration system is operating; and means, responsive to the determined rate of product temperature rise, for selecting the predetermined low temperature so as to prevent the temperature of the product from rising above the predetermined maximum temperature during the second predetermined time period of each day.

* * * * *